(12) United States Patent
Chiang et al.

(10) Patent No.: US 11,030,380 B2
(45) Date of Patent: Jun. 8, 2021

(54) SYNERGISTIC DESIGN METHOD FOR FABRICATING INTEGRATED CIRCUIT

(71) Applicant: Taiwan Semiconductor Manufacturing Co., Ltd., Hsinchu (TW)

(72) Inventors: Katherine H. Chiang, New Taipei (TW); Chung-Te Lin, Tainan (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 16/548,253

(22) Filed: Aug. 22, 2019

(65) Prior Publication Data

US 2021/0056175 A1    Feb. 25, 2021

(51) Int. Cl.
*G06F 30/398* (2020.01)
*G06F 30/327* (2020.01)
*G06F 119/18* (2020.01)

(52) U.S. Cl.
CPC .......... *G06F 30/398* (2020.01); *G06F 30/327* (2020.01); *G06F 2119/18* (2020.01)

(58) Field of Classification Search
CPC .. G06F 30/398; G06F 30/327; G06F 2219/18; G06F 119/18; G06F 2119/18
See application file for complete search history.

(56) References Cited

U.S. PATENT DOCUMENTS

2016/0085898 A1* 3/2016 Manohar ............... G06F 30/398
716/124
2020/0019665 A1* 1/2020 Anderson ............ G06F 30/327

* cited by examiner

*Primary Examiner* — Vuthe Siek
(74) *Attorney, Agent, or Firm* — McClure, Qualey & Rodack, LLP (57) ABSTRACT

A synergistic design method for an integrated circuit (IC) is provided. The synergistic design method includes forming a standard cell library and a non-standard cell library, implementing an IC design process from a high-level behavior specification through a gate-level netlist to a physical layout, and verifying the physical layout to fabricate the IC. Each standard cell of the standard cell library performs a Boolean logic operation. Each non-standard cell of the non-standard cell library performs a complex function beyond the Boolean logic operation. A conversion process is executed for translating a circuit function into a Boolean network to generate the gate-level netlist based on the standard cells of the standard cell library corresponding to the circuit function. A direct mapping is executed on the non-standard cell by skipping the conversion process during the IC design process to generate the gate-level netlist.

20 Claims, 11 Drawing Sheets

SYNERGISTIC DESIGN METHOD FOR FABRICATING INTEGRATED CIRCUIT

BACKGROUND

The semiconductor integrated circuit (IC) industry has experienced rapid growth. Continual advances in semiconductor manufacturing processes have resulted in semiconductor device structures with finer features and/or higher degrees of integration. Functional density (i.e., the number of interconnected devices per chip area) has generally increased while feature size (i.e., the smallest component that can be created using a fabrication process) has decreased. This scaling-down process generally provides benefits by increasing production efficiency and lowering associated costs.

Over the last four decades, the semiconductor fabrication industry has been driven by demands for greater performance (e.g., increased processing speed, memory capacity, etc.), a shrinking form factor, extended battery life, and lower cost. In response to these demands, the industry has continually reduced the size of semiconductor device components, so that modern day integrated chips may include millions or billions of semiconductor devices and circuits arranged on a single semiconductor die. These numerous circuits are generally designed using highly automated processes which involve selecting cells from a library of cells. Typically, a very large number of different circuit designs using various cell combinations can meet a functional specification for a circuit.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some embodiments of the disclosure are described. Additional operations can be provided before, during, and/or after the stages described in these embodiments. Some of the stages that are described can be replaced or eliminated for different embodiments. Additional features can be added to the semiconductor device. Some of the features described below can be replaced or eliminated for different embodiments. Although some embodiments are discussed with operations performed in a particular order, these operations may be performed in another logical order.

Figure 1A:
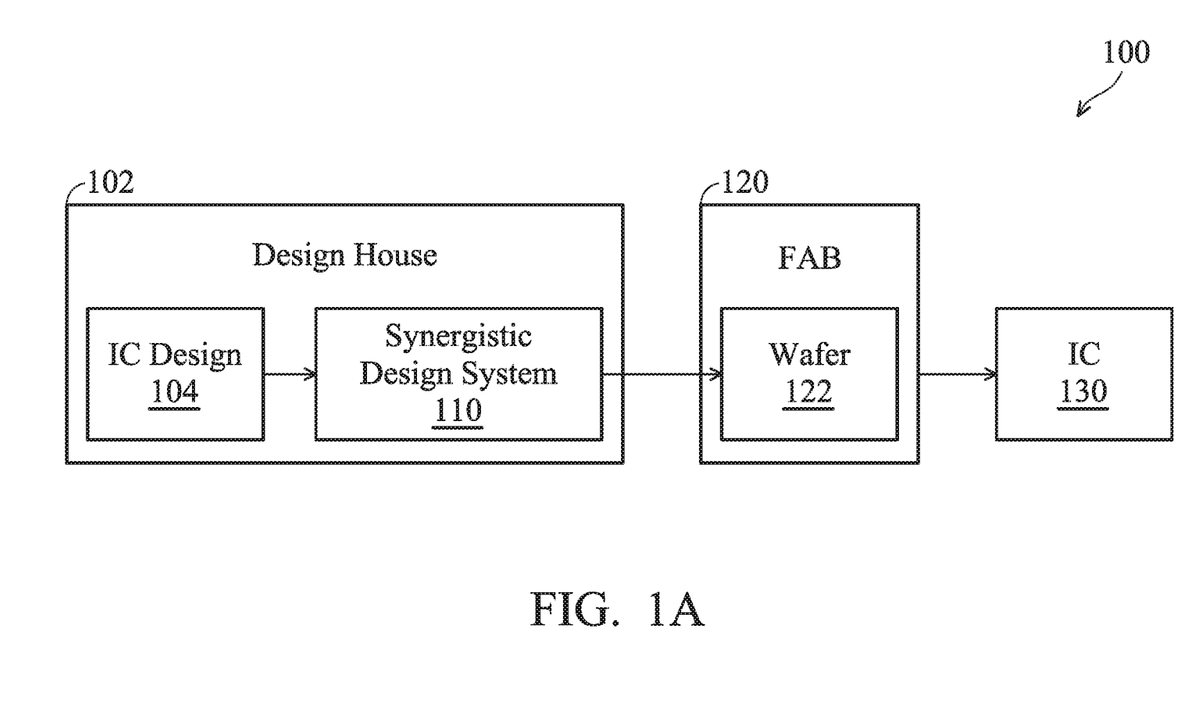
FIG. 1A is a simplified block diagram of an embodiment of an integrated circuit (IC) manufacturing system and an associated IC manufacturing flow.

FIG. 1A is a simplified block diagram of an embodiment of an integrated circuit (IC) manufacturing system 100 and an associated IC manufacturing flow, which may benefit from various aspects of the present disclosure. The IC manufacturing system 100 includes a plurality of entities, such as a design house 102, an synergistic design system 110, and an IC manufacturer 120 (i.e., a fab), that interact with one another in the design, development, and manufacturing cycles and/or services related to manufacturing at least one integrated circuit (IC) 130. The IC 130 may include a plurality of semiconductor devices.

The plurality of entities are connected by a communications network, which may be a single network or a variety of different networks, such as an intranet and the Internet, and may include wired and/or wireless communication channels. Each entity may interact with other entities and may provide services to and/or receive services from the other entities. One or more of the IC design 104, synergistic design system 110, and IC manufacturer 120 may be owned by a single larger company, and may even coexist in a common facility and use common resources.

The design house (or design team) 102 generates an IC design 104. In some embodiments, the IC design 104 includes processing data which are used in layout pattern, manufacturing parameters, mask design and semiconductor processes for manufacturing the IC 130. The IC design 104 may further include various geometrical patterns designed for the IC 130. The geometrical patterns correspond to patterns of metal, oxide, or semiconductor layers that make up the various components of the IC 130 to be fabricated. The various layers combine to form various IC features.

For example, a portion of the IC design 104 includes various IC features, such as active regions, gate electrodes, sources and drains, metal lines or vias of an interlayer interconnection, and openings for bonding pads, to be formed in a semiconductor substrate (such as a silicon wafer) and various material layers disposed on the semiconductor substrate. The design house 102 implements a proper design procedure to form the IC design 104. The design procedure may include logic design, physical design, and/or place and route.

The synergistic design system 110 is configured to receive the IC design 104 in order to generate gate-level netlist and its associated layout pattern for manufacturing the semiconductor devices and circuits on the wafer 122. Therefore, the semiconductor process is performed on the wafer 122 in the FAB 120 according to the synergistic design and layout pattern which were determined by the synergistic design system 110.

The IC manufacturer 120, such as a semiconductor foundry, uses the processing parameters generated by the synergistic design system 110 to fabricate the IC 130. The IC manufacturer 120 is an IC fabrication business that can include a myriad of manufacturing facilities for the fabrication of a variety of different IC products. For example, there may be a first manufacturing facility for the front end fabrication of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business.

In the present embodiment, a wafer 122 is fabricated using one or more masks to form the IC 130. The semiconductor wafer includes a silicon substrate or another proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The wafer 122 may further include various doped regions, dielectric features, and multilevel interis connected to (formed at subsequent manufacturing operations).

Figure 1B:
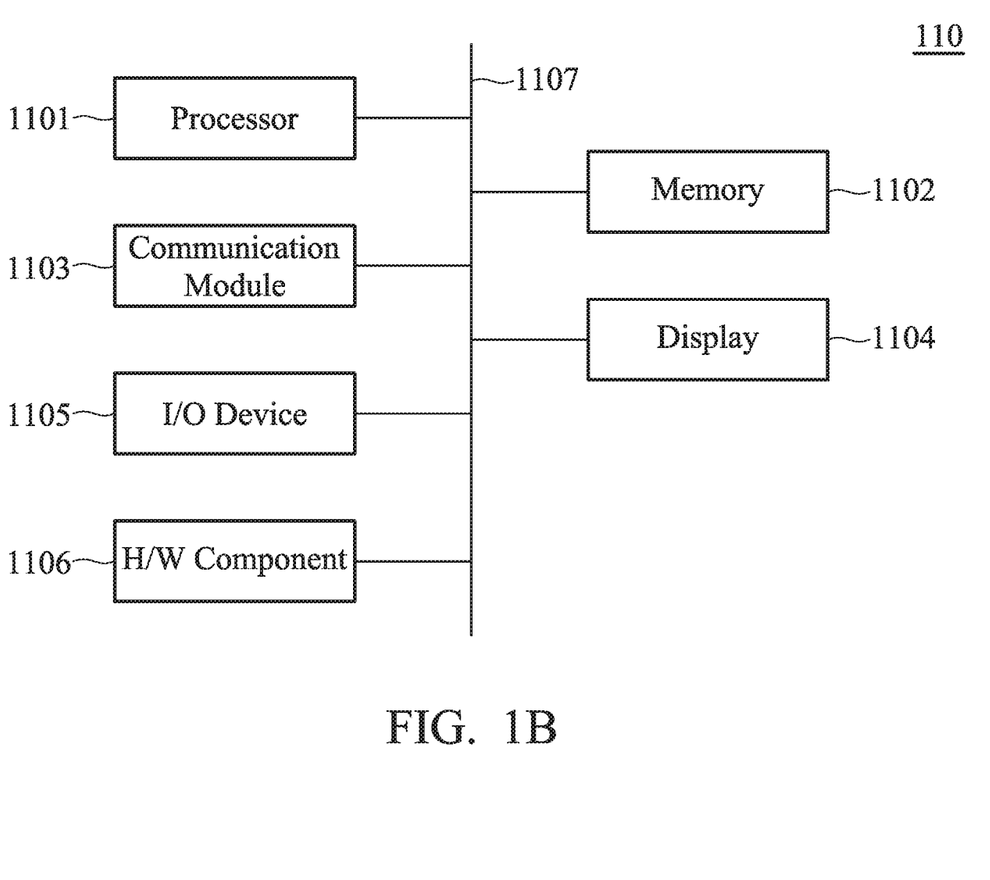
FIG. 1B is a more detailed block diagram of the layout pattern design system shown in FIG. 1A according to various aspects of the present disclosure.

FIG. 1B is a more detailed block diagram of the synergistic design system 110 shown in FIG. 1A according to various aspects of the present disclosure. One or more of the tools and systems and operations described with respect to FIGS. 2-6 is realized in some embodiments by the synergistic design system 110 of FIG. 1B. The IC manufacturing system 100 includes a processor 1101, a memory 1102, a communication module 1103, a display 1104, an input/output (I/O) device 1105, and one or more hardware components 1106 communicatively coupled via a bus 1107 or another interconnection communication mechanism.

The processor 1101 could include a digital signal processor (DSP), a microcontroller (MCU), a central-processing unit (CPU) or a plurality of parallel processors relating the parallel processing environment to implement the operating system (OS), firmware, driver and/or other applications of the synergistic design system 110.

The memory 1102 includes, in some embodiments, a random access memory (RAM) or another dynamic storage device or read only memory (ROM) or other static storage devices, coupled to the bus 1107 for storing data and/or instructions to be executed by the processor 1101. The memory 1102 is also used, in some embodiments, for storing temporary variables or other intermediate information during the execution of instructions to be executed by the processor 1101.

The communication module 1103 is operable to communicate information such as IC design layout files with the other components in the IC manufacturing system 100, such as design house 102. Examples of communication modules may include Ethernet cards, 802.11 WiFi devices, cellular data radios, and/or other suitable devices known in the art.

The display 1104 is utilized to display the processing data and processing parameter the IC 130. The display 1104 can be a liquid-crystal panel or a touch display panel. The I/O device 1105 includes an input device, an output device and/or a combined input/output device for enabling user interaction with the synergistic design system 110. An input device includes, for example, a keyboard, keypad, mouse, trackball, trackpad, and/or cursor direction keys for communicating information and commands to the processor 1101. An output device includes, for example, a display, a printer, a voice synthesizer, etc. for communicating information to the user.

Figure 2:
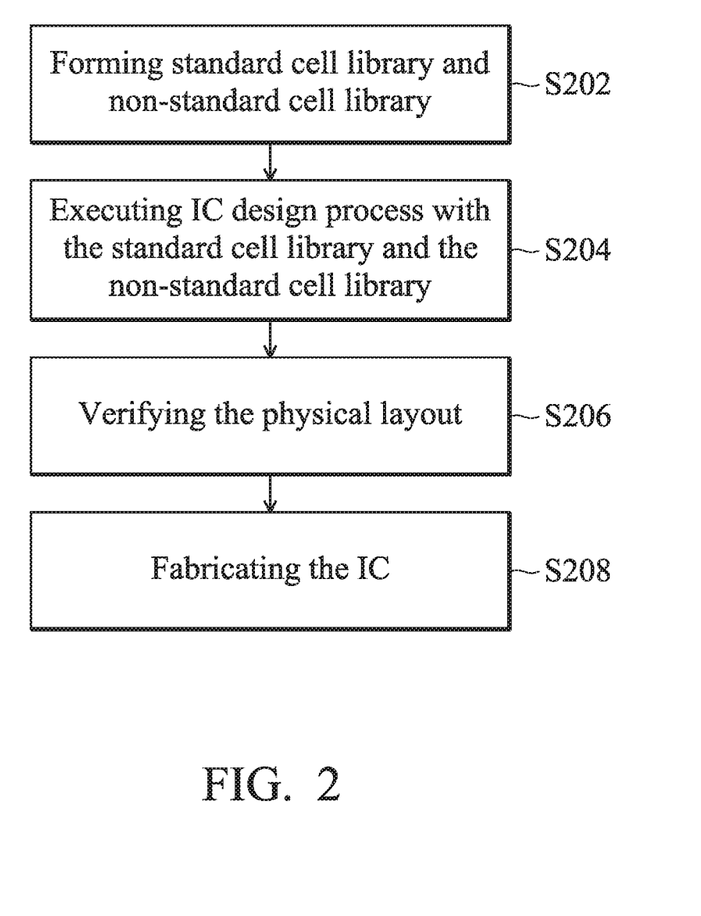
FIG. 2 is a flow chart illustrating the synergistic design method for designing and fabricating IC in accordance with some embodiments.

FIG. 2 is a flow chart illustrating the synergistic design method for designing and fabricating IC in accordance with some embodiments. The process flow of the synergistic design method utilizes one or more highly automated processing tools, such as the electronic design automation (EDA) tools, to carry out one or more stages or operations in the synergistic design method.

In operation S202, the standard cell library and the non-standard cell library are formed respectively or simultaneously. The standard cell library includes various kinds of standard cells. Each of the standard cells is configured to perform a, or a composite of Boolean logic operations with or without state retention. The non-standard cell library includes various kinds of non-standard cells. Each of the non-standard cells is configured to perform a complex function beyond or different from the Boolean logic operation. In some embodiments, the features of the non-standard cell are specific and unique and might not be available or catchable by the traditional Boolean logic.

In operation S204, IC design process is executed and implemented in association with the standard cell library and the non-standard cell library. In some embodiment, the IC design process is performed from a high-level behavior specification through a gate-level netlist to a physical layout by utilizing the standard cell and the non-standard cell.

The IC design process aims at implementing the IC chip design from a high-level specification to a physical layout which is verified for, for example, functionality, performance, power, and area. The standard cell library and the non-standard cell library provide physical design of cells and abstraction of the physically designed cells (e.g. SPICE model) for the cells to be employed as building blocks in the IC design process.

Furthermore, the standard cell library and the non-standard cell library at operation S202 are carried out separately from and prior to certain stages of the IC design process as illustrated in operation S204. In other embodiments, the standard cell library and the non-standard cell library at operation S202 are incorporated into the IC design process at operation S204.

More specifically, the IC design process includes a conversion process for translating required circuit function into its corresponding Boolean network. Technology mapping then conducts performance and area (PPA) optimization by systematically finding the best combination of standard cells that is equivalent to the Boolean network and satisfies certain interconnection and/or layout constraints. Considering the scale of modern circuits, the optimization can only be done automatically based on the information encoded in the standard cell library. However, the conversion process of the IC design process may not be executed on the non-standard cells, whose functions have no equivalence in traditional Boolean network. Separated direct mapping step is executed on the non-standard cell by skipping the conversion process during the IC design process to generate the gate-level netlist.

In operation S206, the physical layout based on the implementation of the IC design process is verified to fabricate the IC by EDA tools or other circuit simulation tools. The layout verification includes evaluating a constraint coverage and a routing coverage. The constraint coverage indicates the amount of constraints which are observed and obeyed. For example, when there are ten constraints and eight of them are observed, the constraint coverage is 80%.

When the layout is verified and meet the requirement of IC design (such as the voltage gain or the bandwidth), operation S208 will be executed that the IC 130 can be fabricated and manufactured based on the certified layout. Afterwards, some semiconductor processes are performed on the wafer 122 to manufacture at least one IC 130 corresponding to the certified layout. When the layout does not verified to meet the requirement of IC design, it means the layout is not certified, and the data for designing the IC 130 needs to be revised and modified.

Figure 3A:
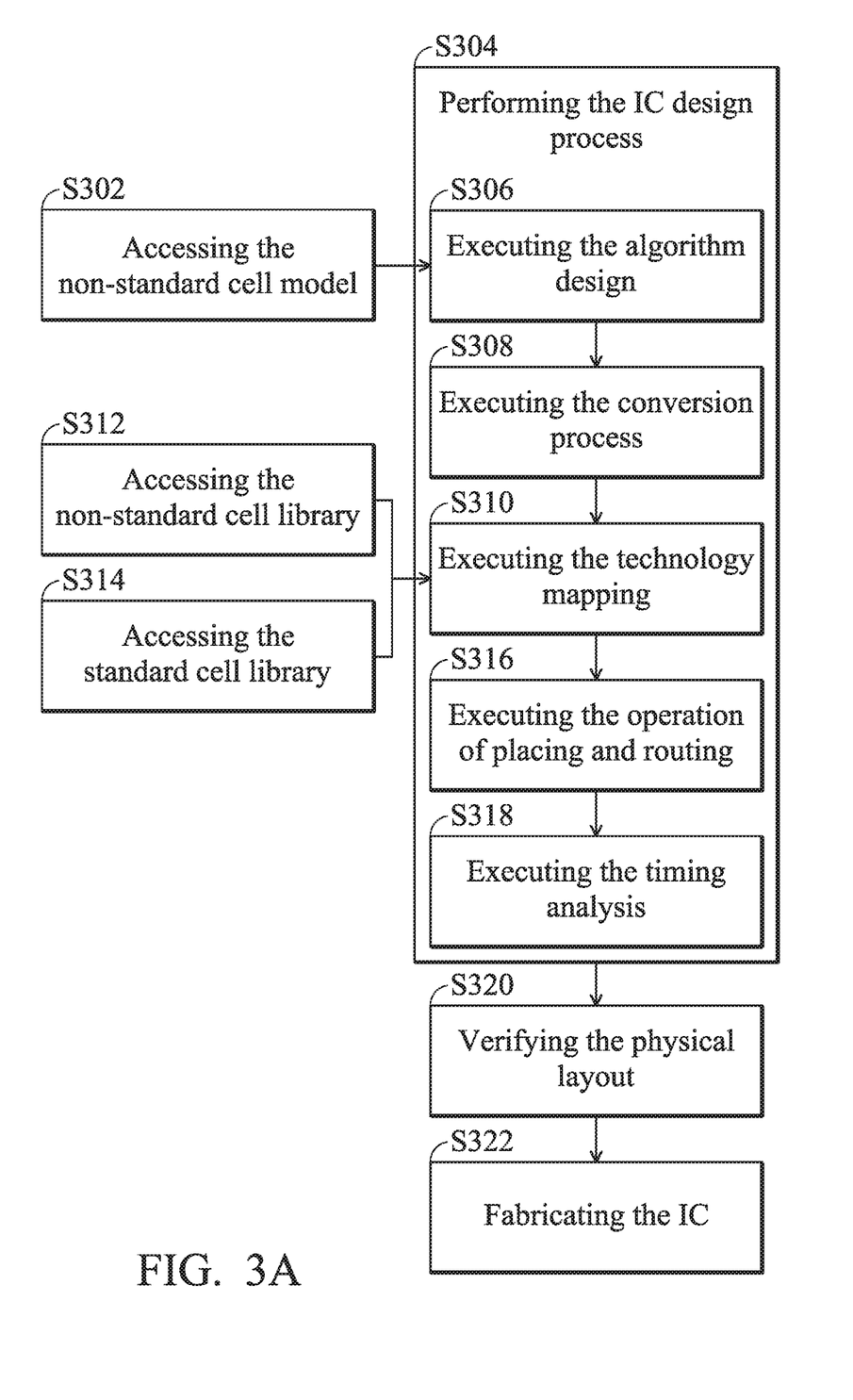
FIG. 3A is another flow chart illustrating the synergistic design method for designing and fabricating IC in accordance with some embodiments.

FIG. 3A is another flow chart illustrating the synergistic design method for designing and fabricating IC in accordance with some embodiments. In operation S302, the non-standard cell model is accessed by the synergistic design system 110 to specify function, variation and aging information of the non-standard cells. In other embodiments, the standard cell model is also accessed during the operation S302.

Afterwards, operation S304 will be executed to perform the IC design process. In some embodiments, the IC design process includes a series of operations such as the algorithm design, the conversion process, the technology mapping, the placing and routing, and the timing analysis. Each of the above operations will be illustrated in more detail.

Specifically, in operation S306, the algorithm design is executed by the synergistic design system 110 based on the accessed or received non-standard cell model. The algorithm design is utilized to describe and illustrate the high-level behavior specification in association with the non-standard cell model.

More specifically, the IC 130 is described in terms of various modules that serve specific functions respectively as the high-level behavior specification. Further, exploration for options include design architectures is performed to consider, for example, tradeoffs in optimizing design specifications and cost. Timing requirements of the IC 130 are specified at this stage.

Furthermore, during the algorithm design of operation S306, the modules for the IC 130 are described at the register transfer level (RTL) using the VHDL or Verilog, and are verified for functional accuracy. In other words, the high-level behavior specification is translated or complied into VHDL or Verilog by the algorithm design in operation S306.

Figure 3B:
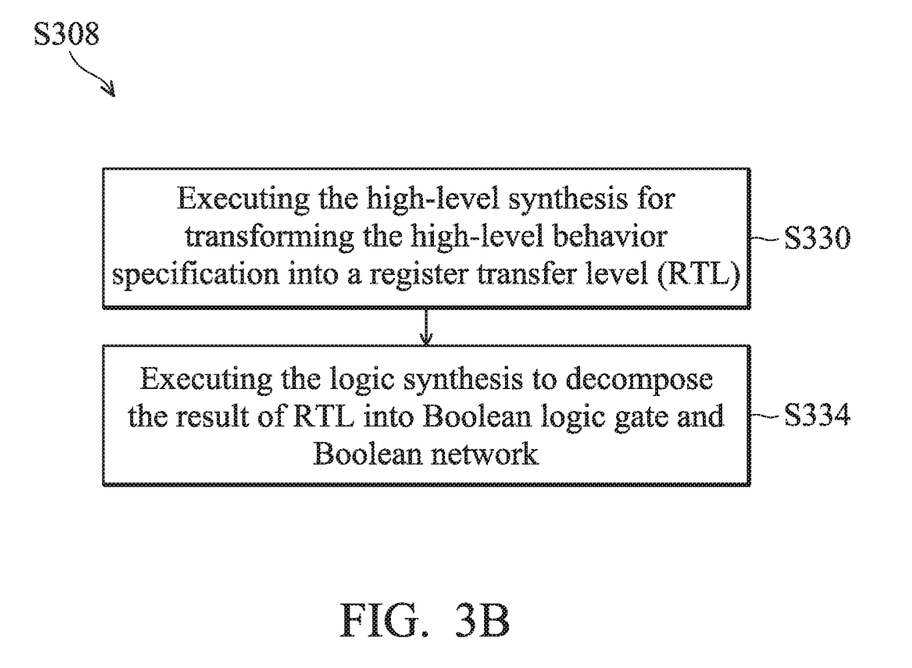
FIG. 3B is a flow chart illustrating the conversion process of the synergistic design method for designing and fabricating IC in accordance with some embodiments.
Figure 3C:
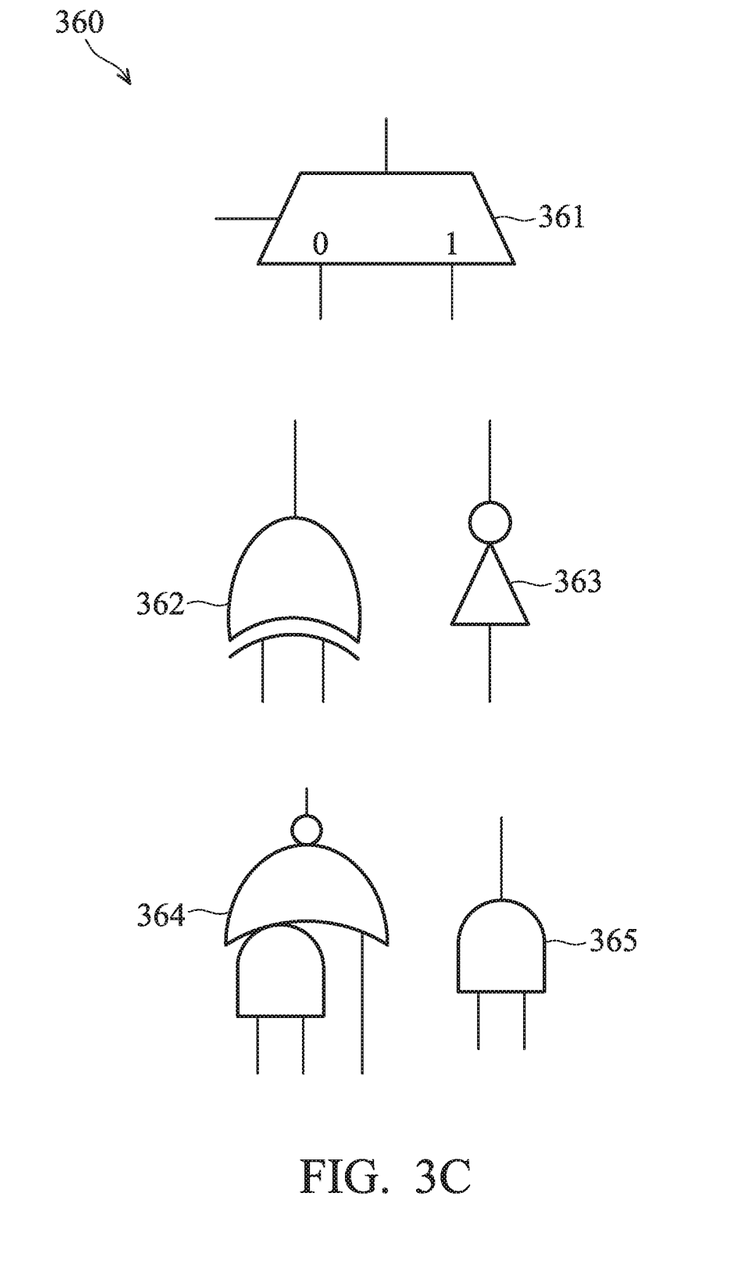
FIG. 3C is a schematic diagram illustrating the Boolean logic gate of the synergistic design method for designing and fabricating IC in accordance with some embodiments.
Figure 3D:
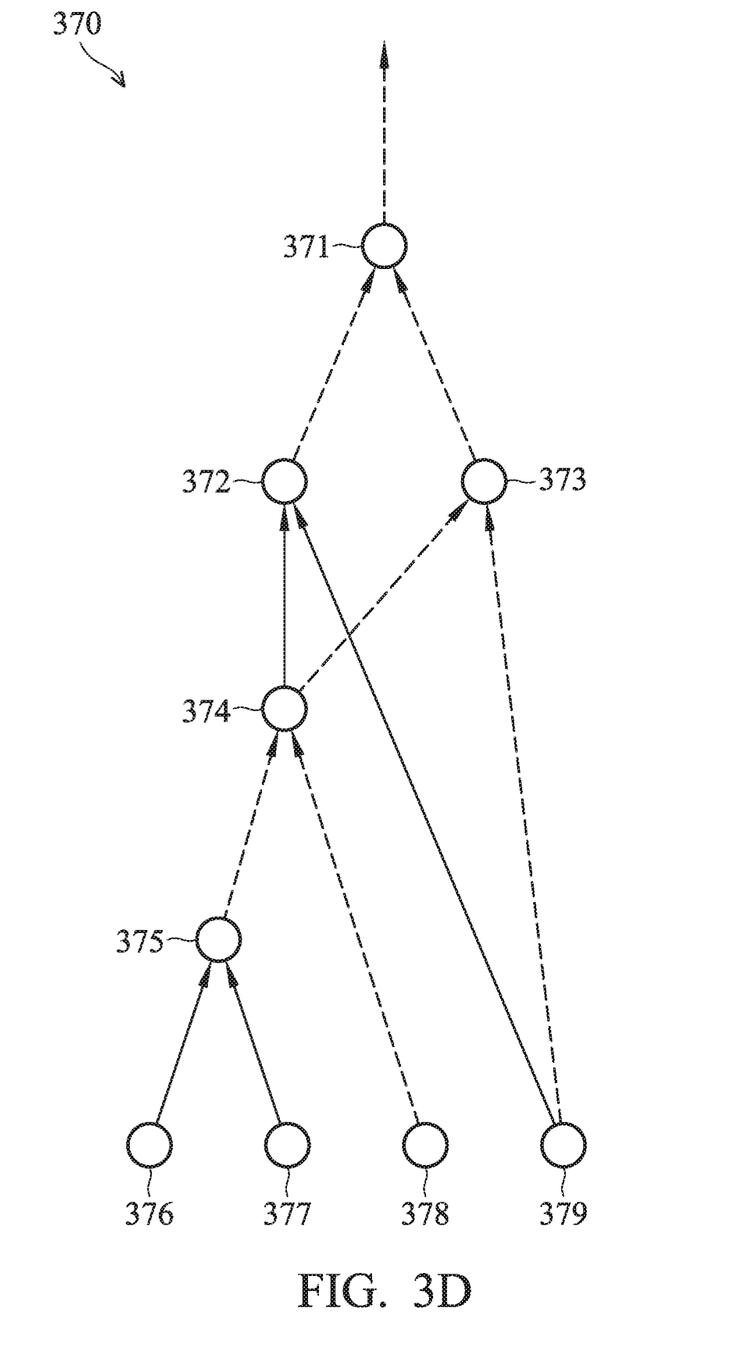
FIG. 3D is a schematic diagram illustrating the Boolean network of the synergistic design method for designing and fabricating IC in accordance with some embodiments.

In operation S308, the conversion process is executed by the synergistic design system 110 for translating high-level behavior specification into a Boolean network 370 (shown in FIG. 3D in the form of and-Inverter graph (AIG)), which is to be implemented with Boolean logic gates 360 (shown in FIG. 3C) as building blocks. Therefore, the high-level behavior specification is transformed, compiled or re-developed in the form of the gate-level netlist 380 (shown in FIG. 3D) by utilizing the standard cell library which defines corresponding Boolean logic gate(s) of each cell and the Boolean network 370. The Boolean logic gates 360, the Boolean network 370 and the gate-level netlist 380 are further illustrated in FIG. 3C-FIG. 3E.

In one embodiment, the conversion process in operation S308 further includes three operations: the high-level synthesis, the hardware description language (HDL) description, and the logic synthesis. The specific functional processes for the high-level synthesis, the HDL description, and the logic synthesis are illustrated in more detail in FIG. 3B, and will be explained later.

It should be noted that the conversion process in operation S308 is mainly performed on the standard cells. In some embodiments, the non-standard cell might be described in the algorithm design of operation S306. However, the "no-logic-mapping" flag is contained or equipped with the non-standard cell to skip or ignore the conversion process of the next operation S308. Accordingly, the conversion process in operation S308 will not be executed on the non-standard cell.

In some embodiment, a direct mapping is executed on the non-standard cell by skipping the conversion process during the IC design process to generate the gate-level netlist 380. Therefore, by utilizing the "no-logic-mapping" flag, the utilization of non-standard cell could be incorporated into the IC design process S304 of the proposed synergistic design method.

In operation S310, the technology mapping is executed by the synergistic design system 110 based on the Boolean logic gate 360 and the Boolean network 370 to establish the gate-level netlist 380. In addition, the non-standard cell library is accessed in operation S312, and the standard cell library is accessed in operation S314. The standard cell library includes various kinds of standard cells. Each of the standard cells performs a Boolean logic operation. The non-standard cell library includes various kinds of non-standard cells. Each of the non-standard cells performs a complex function beyond the Boolean logic operation.

In some embodiments, the Boolean network 370 is mapped to a combination of Boolean logic gates 360 corresponding to the standard cell library in association with separated mapping of the "no-logic-mapping" part to the non-standard cell library to generate the gate-level netlist 380 by the technology mapping in operation S310 after the logic synthesis in operation S308. Accordingly, the gate-level netlist 380 is utilized to represent and describe the characteristic features of the high-level behavior specification.

Accordingly, the modules related the high-level behavior specifications for the IC 130 described in RTL are translated into a gate-level netlist 380. In some embodiments, technology mapping of the Boolean network 370 to available cells in the created standard cell library, and the flagged part to non-standard cell library also happen at this stage. After the technology mapping is done, the IC design flow has gone through the front-end design process and enters into a back-end physical design process in subsequent stages.

Afterwards, in operation S316, the operation of placing and routing is executed by the synergistic design system 110 for the gate-level netlist 380 after the technology mapping at operation S310. In some embodiments, the gate-level netlist 380 is partitioned into a plurality of blocks after the technology mapping, and a floorplan operation is executed on the blocks based on the partitioning to generate the physical layout for fabricating the IC 130.

More specifically, the proposed synergistic design method takes constraints as weighted edges in both the partitioning and floorplanning operations. The above constraints could be extracted from the high-level behavior specification, the non-standard cell library or the standard cell library. Since the constraints are transformed into weighted edges, partitioning can simultaneously deal with these constraints and generate the layout efficiently. Therefore, the location arrangements in the layout will be compact and tight. In addition, the total area of the layout can also be reduced accordingly.

Therefore, the gate-level netlist 380 is partitioned into blocks and a floorplan for the blocks is created. Mapped cells of Boolean logic gates 360 in the blocks are placed at specific locations in a chip area of the IC 130. Furthermore, a clock network could be synthesized and interconnects connecting the cells are routed. In some embodiments, timing-driven placement and routing of the IC chip design are performed to plan for timing closure at an earlier design stage. After this stage, a placed-and-routed physical layout of the IC 130 is created.

Afterwards, in operation S318, the timing analysis is executed by the synergistic design system 110 on the gate-level netlist 380 after the operations of placing and routing at operation S316. The timing analysis is utilized for optimizing power, performance and area (PPA) of the gate-level netlist 380 and the physical level after executing the partitioning and the floorplanning operation.

In some embodiments, timing analysis and post-route optimization are performed on the gate-level netlist 380 to ensure timing closure. The timing models in the standard cell library and the non-standard cell library are used for delay calculation during timing analysis. The physical layout of the IC 130 is checked to ensure correspondence to the gate-level netlist 380, and to ensure clean of, for example, electrical issues and lithographic issues for manufacturing. Incremental fixing can be performed to achieve final signoff of the design flow of IC 130 before tape-out.

In operation S320, the physical layout based on the optimized gate-level netlist 380 by the IC design process of operation 304 is verified to fabricate the IC 130 by EDA tools or other circuit simulation tools. The layout verification includes evaluating a constraint coverage and a routing coverage. The constraint coverage indicates the amount of constraints which are observed and obeyed.

When the physical layout is verified and meet the requirement of IC design, operation S322 will be executed that the IC 130 can be fabricated and manufactured based on the verified physical layout of the operation S320. Afterwards, some semiconductor processes will be performed on the wafer 122 to manufacture at least one IC 130 corresponding to the verified physical layout. When the layout does not verified to meet the requirement of IC design, it means the layout is not certified, and the data for designing the IC 130 needs to be revised and modified.

FIG. 3B is a flow chart illustrating the execution of conversion process of the synergistic design method for designing and fabricating the IC 130 in accordance with some embodiments. As shown in FIG. 3B, the execution of the conversion process in operation S308 includes the following two operations: executing the high-level synthesis in operation S330, and executing the logical synthesis in operation S334.

In operation S330, the high-level behavior specification is transformed or compiled into a register transfer level (RTL) by applying high-level synthesis on the algorithm designed in operation S308 The resulted RTL is represented in the form of hardware description language (HDL). In operation S334, the result of the RTL is decomposed or disintegrated into interconnected Boolean logic gates 360 realizing the Boolean network 370 based on the non-standard cell model by the logic synthesis.

The synergistic design method in FIG. 3B are exemplary. Other sequence of the operations, stages or operations, partition of the operations, or additional operations or operations before, between or after the operations shown are within the applicable scope of the present disclosure.

FIG. 3C is a schematic diagram illustrating the library of Boolean logic gates 360 realized by a standard cell library of the synergistic design method for designing and fabricating the IC 130 in accordance with some embodiments. As shown in FIG. 3C, the Boolean logic gates 360 could include a multiplexer (MUX) 361, an exclusive-or (XOR) gate 362, an inverter 363, a combination gate 364 of an exclusive-nor (XNOR) gate and an AND gate, or a AND gate 365, which are not limited. The library of Boolean logic gates form the building blocks for technology mapping.

FIG. 3D is a schematic diagram illustrating the Boolean network 370 of the synergistic design method for designing and fabricating the IC 130 in accordance with some embodiments. The Boolean network 370 is mapped with the Boolean logic gate 360 in association with the non-standard cell library and the standard cell library to generate the gate-level netlist 380.

Specifically, the Boolean network 370 is utilized to describe the connection and topology of a group of Boolean logic gates 360. As shown in FIG. 3D, the Boolean network 370 includes a plurality of Boolean logic gates 371~379. For example, the Boolean logic gate 371 receives outputs from the Boolean logic gates 372 and 373. The Boolean logic gate 372 receives outputs from the Boolean logic gates 374 and 379. The Boolean logic gate 373 receives outputs from the Boolean logic gates 374 and 379. Therefore, the input and output relationship between each of the Boolean logic gates 374 and 379 could be illustrated and clarified by the Booleans network 370.

Figure 3E:
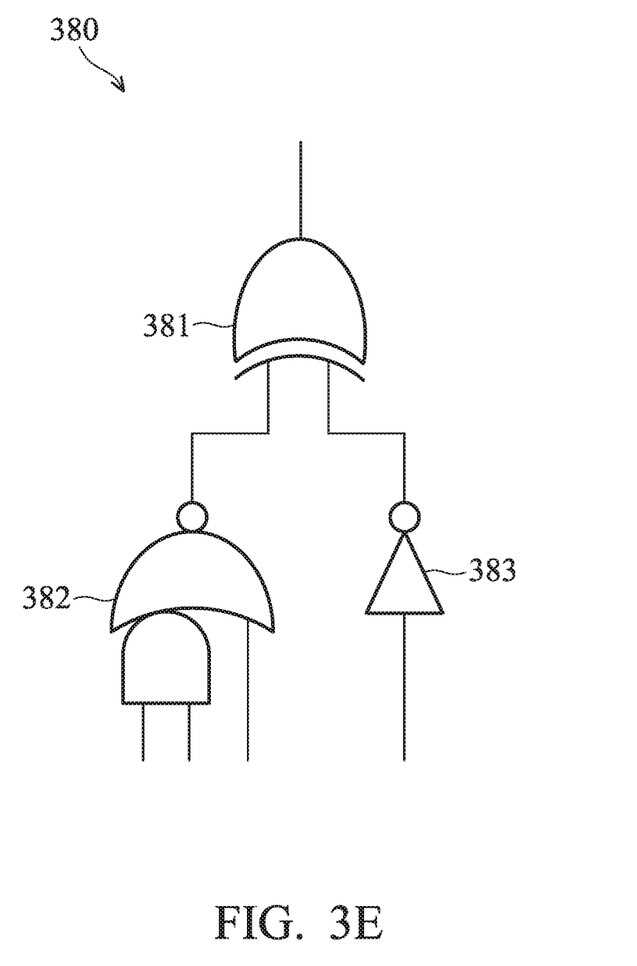
FIG. 3E is a schematic diagram illustrating the gate-level netlist of the synergistic design method for designing and fabricating IC in accordance with some embodiments.

FIG. 3E is a schematic diagram illustrating the gate-level netlist 380 of the synergistic design method for designing and fabricating the IC 130 in accordance with some embodiments. The gate-level netlist 380 is created by mapping the Boolean network 370 and the Boolean logic gate 360 in association with the non-standard cells and the standard cells in order to generate the physical layout and manufacture the IC 130 accordingly.

As shown in FIG. 3E, the gate-level netlist 380 three Boolean logic gates 381~383. The Boolean logic gate 381 is XOR gate, the Boolean logic gate 382 is a XNOR and AND gate, and the Boolean logic gate 383 is an inerter gate. The outputs of the Boolean logic gates 382 and 383 are transmitted to the input of the Boolean logic gate 381.

Figure 4:
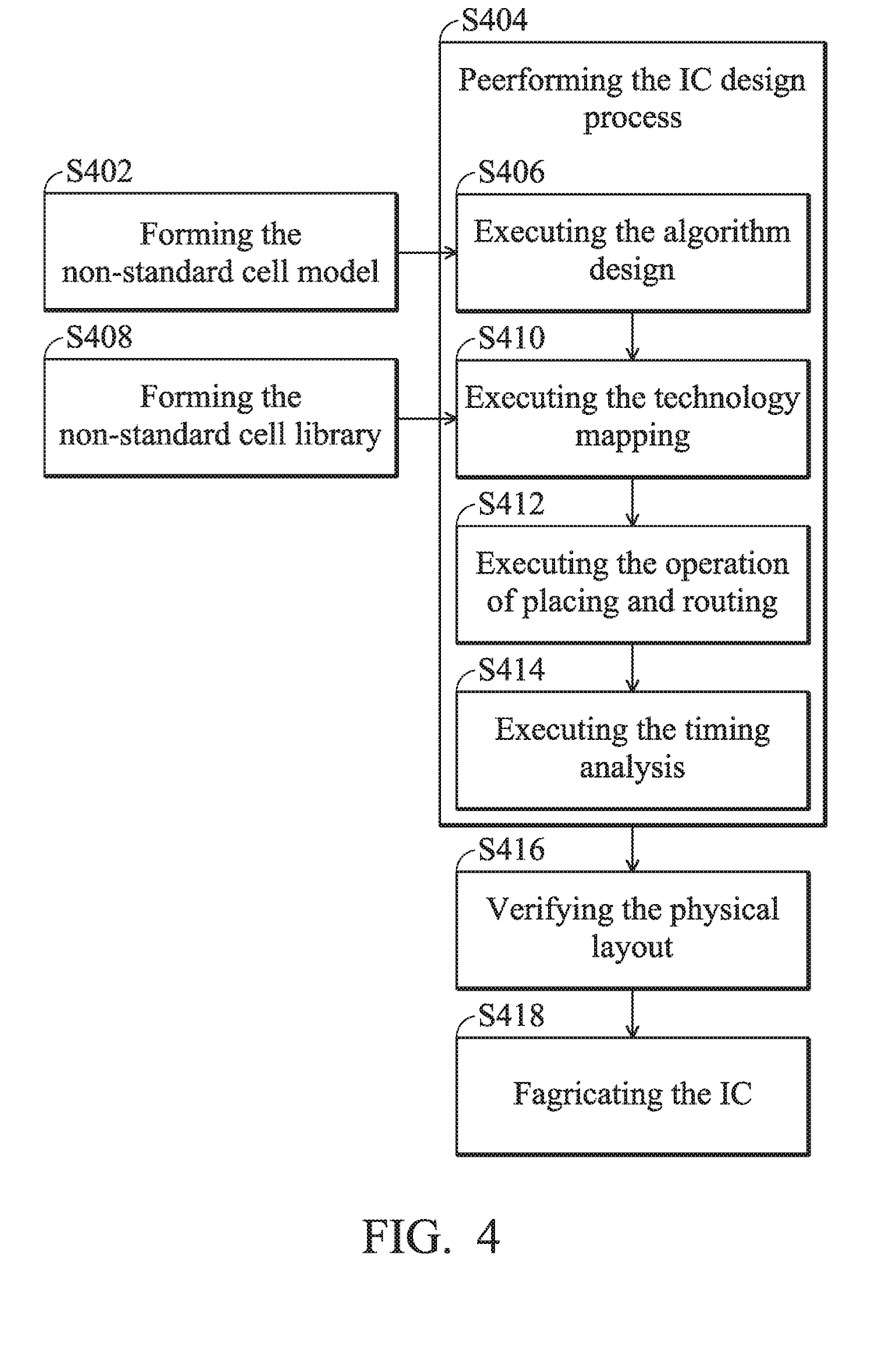
FIG. 4 is another flow chart illustrating the synergistic design method for designing and fabricating IC in accordance with some embodiments.

FIG. 4 is another flow chart for the non-standard cells illustrating the synergistic design method to design and fabricate the IC 130 in accordance with some embodiments on the non-standard cells. Compared to the flow chart in FIG. 3A, a direct mapping is proposed for the non-standard cell by skipping the conversion process during the IC design process S304 to generate the gate-level netlist 380 and fabricate the IC 130.

In operation S402, the non-standard cell model is formed by the synergistic design system 110 to specify function, variation and aging information of the non-standard cells. Afterwards, the IC design process of the operation S404 will be executed which includes the algorithm design, the technology mapping, the placing and routing and the timing analysis.

In operation S406, the algorithm design is executed by the synergistic design system 110 based on the accessed or received non-standard cell model. The algorithm design is utilized to describe and illustrate the high-level behavior specification in association with the non-standard cell model.

In operation S408, the non-standard cell library is formed which includes various kinds of non-standard cells. in some embodiments, each of the non-standard cells is configured to perform a complex function which cannot be captured or supported the Boolean logic operation. In some embodiments, the non-standard cell library includes a neuromorphic computing device whose input-output response is directly used for computing, an in-memory computing device whose computation and memory are executed simultaneously, or a hybrid automaton device involving a discrete behavior and a continuous behavior.

Afterwards, the technology mapping is executed at operation S410 based on the algorithm design and the non-standard cell library. The non-standard cells associated with their models are directly mapped to the network from the algorithm design to generate the gate-level netlist 380. In other words, the gate-level netlist 380 is formed corresponding to the non-standard cell model by directly mapping the non-standard cells without a decomposition of the high-level behavior specification.

In operation S412, the operation of placing and routing is executed by the synergistic design system 110 for the gate-level netlist 380. The gate-level netlist 380 is partitioned into a plurality of blocks after the technology mapping, and a floorplan operation is executed on the blocks based on the partitioning to generate the physical layout for fabricating the IC 130.

In operation S414, the timing analysis is executed by the synergistic design system 110 on the gate-level netlist 380 for optimizing power, performance and area (PPA) of the gate-level netlist 380 and the physical level after executing the partitioning and the floorplanning operation.

In operation S416, the physical layout based on the optimized gate-level netlist 380 by the IC design process is verified to fabricate the IC 130 by EDA tools or other circuit simulation tools. When the physical layout is verified and meet the requirement of IC design, operation S418 will be executed that the IC 130 can be fabricated and manufactured based on the verified physical layout of the operation S416.

The synergistic design method in FIG. 4 are exemplary. Other sequence of the operations, stages or operations, partition of the operations, or additional operations or operations before, between or after the operations shown are within the applicable scope of the present disclosure.

Figure 5A:
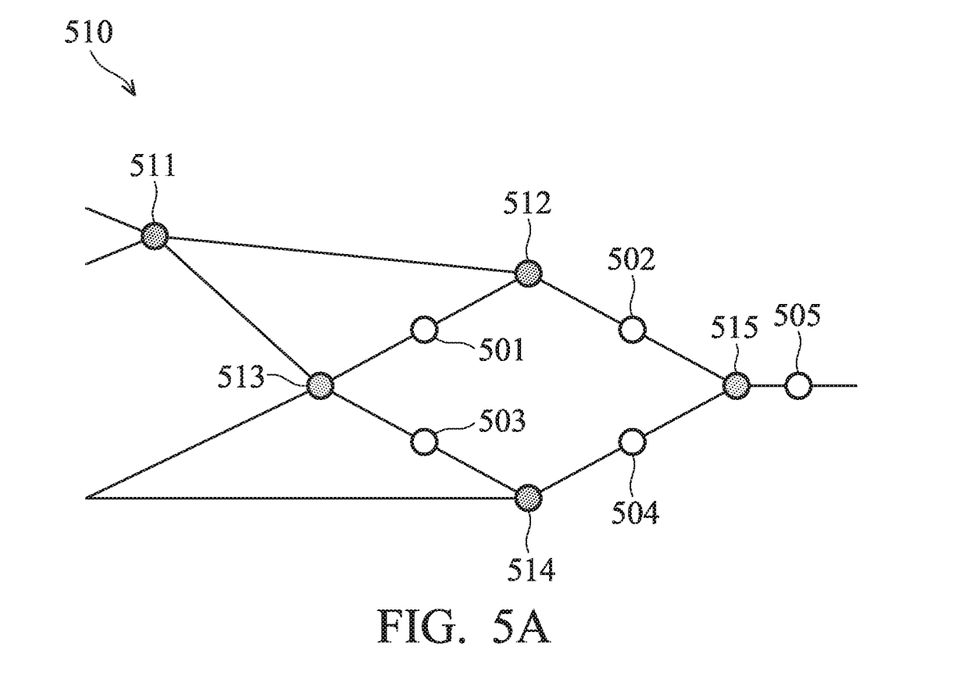
FIG. 5A is a schematic diagram illustrating the Boolean network of the synergistic design method for designing and fabricating IC in accordance with some embodiments.

FIG. 5A is a schematic diagram illustrating the Boolean network 510 of the synergistic design method for designing and fabricating the IC 130 in accordance with some embodiments. In some embodiments, the Boolean network 510 could be utilized to describe the relation and connection between the standard cells 511~515. As shown in FIG. 5A, the standard cell 511 is connected to the standard cells 512 and 513. The standard cell 515 is connected to the standard cells 511, 513 and 515. As described above, the Boolean network 510 is obtained by translating a circuit function that has logic operations corresponding to the standard cells 511~515.

Moreover, at least one dummy node could be added to the Boolean network 510 to represent a certain type of Boolean logic operation, such as the NOT operation. As shown in FIG. 5A, the dummy node 501 is arranged between the two standard cells 512 and 513. The dummy node 502 is arranged between the two standard cells 512 and 515.

Figure 5B:
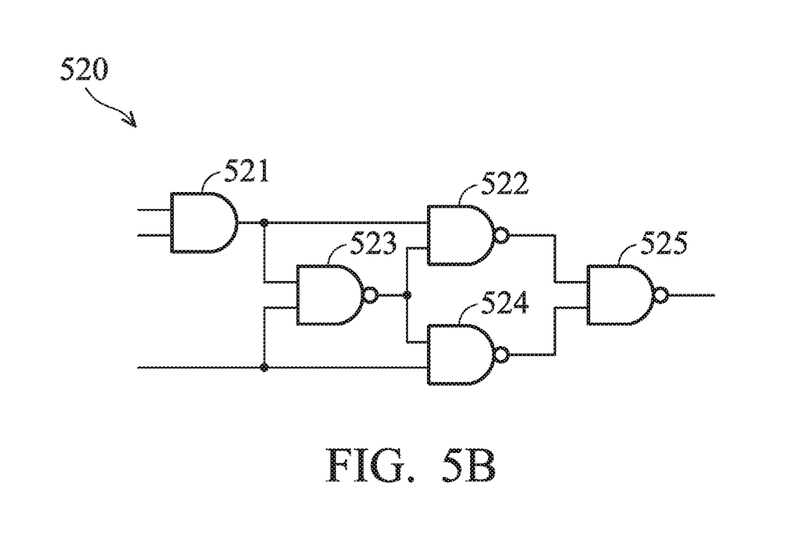
FIG. 5B is a schematic diagram illustrating the gate-level netlist of the synergistic design method for designing and fabricating IC in accordance with some embodiments.

FIG. 5B is a schematic diagram illustrating the gate-level netlist 520 of the synergistic design method for designing and fabricating the IC 130 in accordance with some embodiments corresponding to the Boolean network 510 of FIG. 5A. The connection between the Boolean logic gates 521~525 is clarified by the gate-level netlist 520 in association with the Boolean network 510 of FIG. 5A.

In some embodiments, each standard cell of the Boolean network 510 could be one-to-one mapped to each Boolean logic gate of the gate-level netlist 520, and vice versa. Specifically, the Boolean logic gate 521 (an AND gate) corresponds to the standard cell 511, and the Boolean logic gate 522 (a NAND gate) corresponds to the standard cell 512 and its nearby dummy node. Therefore, the overall gate-level netlist 520 with the standard cells in the standard cell library can be covered by the technology mapping.

Figure 6A:
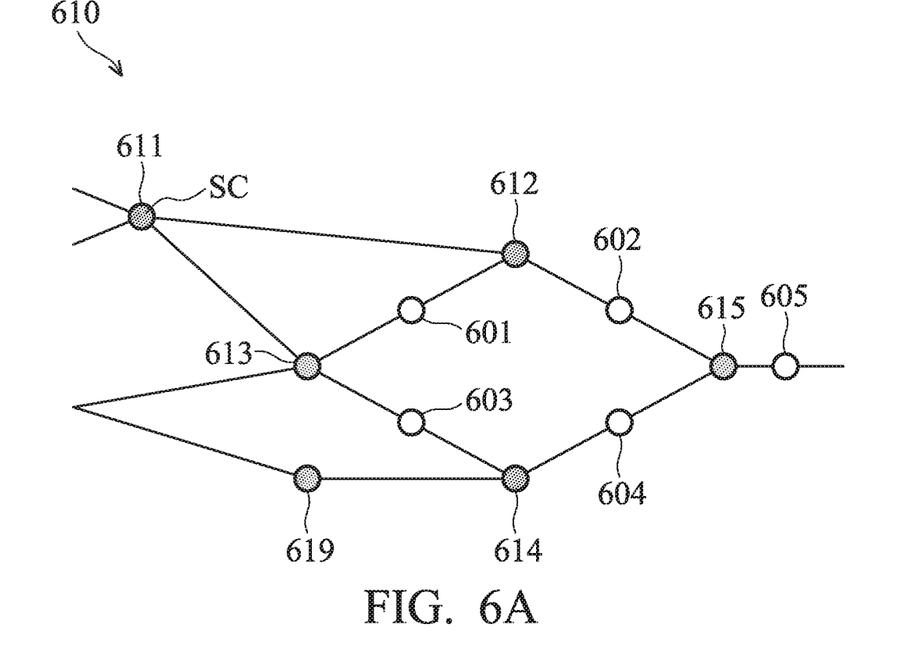
FIG. 6A is a schematic diagram illustrating the Boolean network of the synergistic design method for designing and fabricating IC in accordance with some embodiments.

FIG. 6A is a schematic diagram illustrating the Boolean network 610 of the synergistic design method for designing and fabricating the IC 130 in accordance with some embodiments. Compared to the embodiment of FIG. 5A, another non-standard cell 619 has been further added and incorporated. As shown in FIG. 6A, the non-standard cell 619 is connected to the standard cells 613 and 614. The non-standard cell library could be a neuromorphic computing device, an in-memory computing device, or a hybrid automaton device.

Figure 6B:
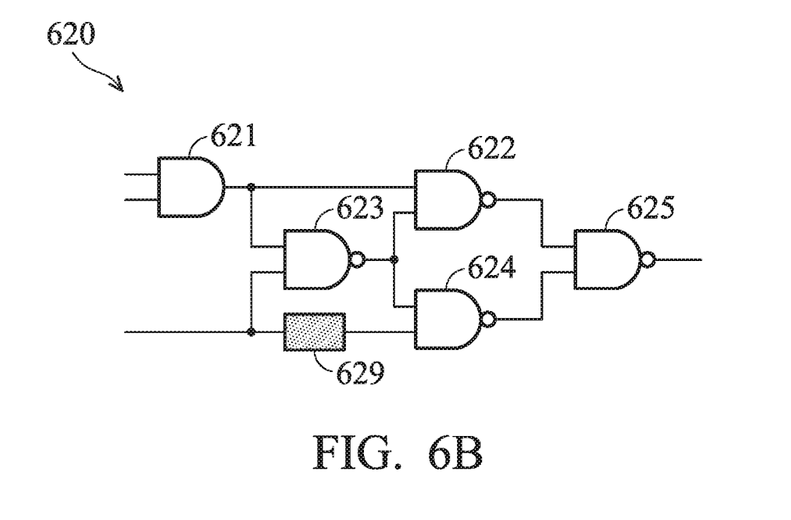
FIG. 6B is a schematic diagram illustrating the gate-level netlist of the synergistic design method for designing and fabricating IC in accordance with some embodiments.

FIG. 6B is a schematic diagram illustrating the gate-level netlist of the synergistic design method for designing and fabricating the IC 130 in accordance with some embodiments in accordance with some embodiments corresponding to the Boolean network 610 of FIG. 6A. The specific (function) gate 629 of FIG. 6B corresponds to the non-standard cell 619 of FIG. 6A. The specific (function) gate 629 is connected to the Boolean logic gates 623 and 624.

It should be noted that the specific function gate 629 belongs to the non-standard cell, and it could not be supported and described by the Boolean logic. Each non-standard cell corresponds to one of a plurality of specific devices whose features are complex and unavailable for the Boolean logic operation. Accordingly, the specific function gate 629 is directly mapped and incorporated into the gate-level netlist 620 without the conversion process and any other decoupling process flow. Therefore, both standard and non-standard cell could be utilized and integrated in one gate-level netlist 620 efficiently and conveniently by the proposed synergistic design method.

While disclosed methods in FIG. 2 to FIG. 4 are illustrated and described below as a series of acts or events, it will be appreciated that the illustrated ordering of such acts or events are not to be interpreted in a limiting sense. For example, some acts may occur in a different order and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

In some embodiments, one or more of the operations and/or functions of the tools and/or systems described with respect to FIGS. 1A-6B is/are implemented by specially configured hardware (e.g., by one or more application-specific integrated circuits or ASIC(s)) which is/are included) separate from or in lieu of the processor 1101. Some embodiments incorporate more than one of the described operations and/or functions in a single ASIC.

In some embodiments, the operations and/or functions are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In accordance with some embodiments, a synergistic design method for designing and fabricating an integrated circuit (IC) is provided. The synergistic design method includes forming a standard cell library and a non-standard cell library, implementing an IC design process from a high-level behavior specification through a gate-level netlist to a physical layout by utilizing the standard cell and the non-standard cell, and verifying the physical layout to fabricate the IC. Each standard cell of the standard cell library is configured to perform a Boolean logic operation, and each non-standard cell of the non-standard cell library is configured to perform a complex function beyond the Boolean logic operation. A conversion process of the IC design process is executed for translating a circuit function into a Boolean network to generate the gate-level netlist based on the standard cells of the standard cell library corresponding to the circuit function, and a direct mapping is executed on the non-standard cell by skipping the conversion process during the IC design process to generate the gate-level netlist. In addition, each non-standard cell belongs to one of a plurality of specific devices whose features are complex and unavailable for the Boolean logic operation.

In accordance with some embodiments, a synergistic design method for designing and fabricating an integrated circuit (IC) is provided. The synergistic design method includes accessing a non-standard cell library and a non-standard cell model, translating a high-level behavior specification of the non-standard cells in association with the non-standard cell model; generating a gate-level netlist corresponding to the non-standard cell model by directly mapping the non-standard cells without a decomposition of the high-level behavior specification; and verifying a physical layout in association with the gate-level netlist to fabricate the IC. The non-standard cell library includes a plurality of non-standard cells to perform a complex function which is unavailable for a Boolean logic operation, and the non-standard cell model is configured to represent features of the non-standard cells. The non-standard cell library includes a neuromorphic computing device whose input-output response is directly used for computing, an in-memory computing device whose computation and memory are executed simultaneously, and a hybrid automaton device involving a discrete behavior and a continuous behavior.

In accordance with some embodiments, an non-transitory computer-readable medium containing instructions which, when executed by a processor of a computer system, cause the processor to execute a synergistic design method is provided. The synergistic design method includes forming a standard cell library and a non-standard cell library, implementing an IC design process from a high-level behavior specification through a gate-level netlist to a physical layout by utilizing the standard cell and the non-standard cell, and verifying the physical layout to fabricate the IC. Each standard cell of the standard cell library is configured to perform a Boolean logic operation, and each non-standard cell of the non-standard cell library is configured to perform a complex function beyond the Boolean logic operation. A conversion process of the IC design process is executed for translating a circuit function into a Boolean network to generate the gate-level netlist based on the standard cells of the standard cell library corresponding to the circuit function, and a direct mapping is executed on the non-standard cell by skipping the conversion process during the IC design process to generate the gate-level netlist. Each non-standard cell belongs to one of a plurality of specific devices whose features are complex and unavailable for the Boolean logic operation.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A synergistic design method for designing and fabricating an integrated circuit (IC), comprising:

forming a standard cell library and a non-standard cell library, wherein each standard cell of the standard cell library is configured to perform a Boolean logic operation, and each non-standard cell of the non-standard cell library is configured to perform a complex function that is different than the Boolean logic operation;

implementing an IC design process from a high-level behavior specification through a gate-level netlist to a physical layout by utilizing the standard cells and the non-standard cells, wherein a conversion process of the IC design process is executed for translating a circuit function into a Boolean network to generate the gate-level netlist based on the standard cells of the standard cell library corresponding to the circuit function, and a direct mapping is executed on the non-standard cell by skipping the conversion process during the IC design process to generate the gate-level netlist; and verifying the physical layout to fabricate the IC, wherein the Boolean network comprises a plurality of dummy nodes, and each of the dummy nodes is arranged between two adjacent standard cells in the Boolean network and is configured to represent a Boolean logic operation, wherein a function gate is connected between a first Boolean logic gate and a second Boolean logic gate in the gate-level netlist, and the function gate of the gate-level netlist corresponds to one of the non-standard cells of the Boolean network, wherein the one of the non-standard cells is connected to a first standard cell corresponding to the first Boolean logic gate and a second standard cell corresponding to the second Boolean logic gate without through the dummy nodes in the Boolean network.

2. The synergistic design method as claimed in claim 1, further comprising forming a non-standard cell model for specifying function, variation and aging information of the non-standard cell.

3. The synergistic design method as claimed in claim 1, wherein each non-standard cell corresponds to one of a plurality of specific devices whose features are complex and unavailable for the Boolean logic operation.

4. The synergistic design method as claimed in claim 2, wherein the IC design process further comprises an algorithm design, and the synergistic design method further comprises:

describing the high-level behavior specification by the algorithm design in association with the non-standard cell model.

5. The synergistic design method as claimed in claim 4, wherein the conversion process comprises a high-level synthesis, a hardware description language (HDL) description, and a logic synthesis, and the synergistic design method further comprises:

transforming the high-level behavior specification into a register transfer level (RTL) by the high-level synthesis after the algorithm design; and generating a result of the RTL based on the high-level synthesis by the HDL description.

6. The synergistic design method as claimed in claim 5, further comprising:

decomposing the result of the RTL into the Boolean network by the logic synthesis based on the non-standard cell model.

7. The synergistic design method as claimed in claim 6, wherein the IC design process further comprises technology mapping, and the synergistic design method further comprises:

mapping the Boolean network in association with the non-standard cell library and the standard cell library to generate the gate-level netlist by the technology mapping after the logic synthesis, wherein the non-standard cell library is a neuromorphic computing device, an in-memory computing device, or a hybrid automaton device.

8. The synergistic design method as claimed in claim 1, wherein one of the dummy nodes is arranged between the first standard cell and the second standard cell.

9. The synergistic design method as claimed in claim 1, wherein step of verifying the physical layout to fabricate the IC further comprises:

fabricate the IC when the physical layout is verified and meet requirement of IC.

10. A non-transitory computer-readable medium containing instructions which, when executed by a processor of a computer system, cause the processor to execute a synergistic design method comprising:

forming a standard cell library and a non-standard cell library, wherein each standard cell of the standard cell library is configured to perform a logic operation, and each non-standard cell of the non-standard cell library is configured to perform a complex function beyond the logic operation;

implementing an IC design process from a high-level behavior specification through a gate-level netlist to a physical layout by utilizing the standard cells and the non-standard cells, wherein a conversion process of the IC design process is executed for translating a circuit function into a Boolean network to generate the gate-level netlist based on the standard cells of the standard cell library corresponding to the circuit function, and a direct mapping is executed on the non-standard cell by skipping the conversion process during the IC design process to generate the gate-level netlist; and verifying the physical layout to fabricate the IC, wherein the Boolean network comprises a plurality of dummy nodes, and each of the dummy nodes is arranged between two adjacent standard cells in the Boolean network and is configured to represent a Boolean logic operation, wherein a function gate is connected between a first Boolean logic gate and a second Boolean logic gate in the gate-level netlist, and the function gate of the gate-level netlist corresponds to one of the non-standard cells of the Boolean network, wherein the one of the non-standard cells is connected to a first standard cell corresponding to the first Boolean logic gate and a second standard cell corresponding to the second Boolean logic gate without through the dummy nodes in the Boolean network.

11. The non-transitory computer-readable medium as claimed in claim 10, wherein the IC design process further comprises an algorithm design, and the algorithm design is configured to describe the high-level behavior specification in association with the non-standard cell model.

12. The non-transitory computer-readable medium as claimed in claim 11, wherein the synergistic design method further comprises a high-level synthesis, a hardware description language (HDL) description and a logical synthesis, the high-level synthesis is configured to transform the high-level behavior specification into a register transfer level (RTL) by the high-level synthesis, and the HDL description is configured to generate a result of the RTL based on the high-level synthesis.

13. The non-transitory computer-readable medium as claimed in claim 12, wherein the result of the RTL is disintegrated into the Boolean network based on the non-standard cell model by the logic synthesis.

14. The non-transitory computer-readable medium as claimed in claim 13, wherein the IC design process further comprises a technology mapping, and the Boolean network is mapped in association with the non-standard cell library and the standard cell library to generate the gate-level netlist.

15. The non-transitory computer-readable medium as claimed in claim 10, wherein the non-standard cell library comprises a neuromorphic computing device whose input-output response is directly used for computing, an in-memory computing device whose computation and memory are executed simultaneously, or a hybrid automaton device involving a discrete behavior and a continuous behavior.

16. A synergistic design method for designing and fabricating an integrated circuit (IC), comprising:
   forming a standard cell library with a plurality of standard cells and a non-standard cell library with a plurality of non-standard cells, wherein each of the standard cells is configured to perform a Boolean logic operation, and each of the non-standard cells is configured to perform a non-Boolean logic operation;
   implementing an IC design process with the standard cells and the non-standard cells to generate a gate-level netlist corresponding to a high-level behavior specification, wherein a conversion process of the IC design process is executed for translating a circuit function into a Boolean network to generate the gate-level netlist based on the standard cells of the standard cell library corresponding to the circuit function, and a direct mapping is executed on the non-standard cell by skipping the conversion process during the IC design process to generate the gate-level netlist;
   obtaining a physical layout according to the gate-level netlist; and
   fabricate the IC according to the physical layout when constraint coverage and routing coverage of the physical layout meet requirement of the IC,
   wherein each Boolean logic gate of the gate-level netlist corresponds to an individual standard cell of the Boolean network, and a function gate connected between two of the Boolean logic gates in the gate-level netlist corresponds to an individual non-standard cell of the Boolean network,
   wherein the individual non-standard cell is directly connected to the individual standard cells corresponding to the two of the Boolean logic gates in the Boolean network.

17. The synergistic design method as claimed in claim 16, wherein each of the non-standard cells corresponds to one of a plurality of specific devices whose features are complex and unavailable for the Boolean logic operation.

18. The synergistic design method as claimed in claim 16, further comprising forming a non-standard cell model for specifying function, variation and aging information of the non-standard cell.

19. The synergistic design method as claimed in claim 18, wherein the IC design process further comprises an algorithm design, and the synergistic design method further comprises:
   describing the high-level behavior specification by the algorithm design in association with the non-standard cell model.

20. The synergistic design method as claimed in claim 19, wherein the conversion process comprises a high-level synthesis, a hardware description language (HDL) description, and a logic synthesis, and the synergistic design method further comprises:
   transforming the high-level behavior specification into a register transfer level (RTL) by the high-level synthesis after the algorithm design; and
   generating a result of the RTL based on the high-level synthesis by the HDL description.

* * * * *